(12) United States Patent
Gruber et al.

(10) Patent No.: US 9,272,236 B2
(45) Date of Patent: Mar. 1, 2016

(54) FILTRATION SYSTEM

(71) Applicant: IFT GmbH, Uderns (AT)

(72) Inventors: Christoph Gruber, Hippach (AT); Christian Waldner, Luebeck (AT)

(73) Assignee: IFT GMBH, Uderns (AT)

( * ) Notice: Subject to any disclaimer, the term of this patent is extended or adjusted under 35 U.S.C. 154(b) by 49 days.

(21) Appl. No.: 14/210,254

(22) Filed: Mar. 13, 2014

(65) Prior Publication Data

US 2015/0258479 A1    Sep. 17, 2015

(51) Int. Cl.
*B01D 46/00* (2006.01)
*B01D 46/12* (2006.01)

(52) U.S. Cl.
CPC .............. *B01D 46/002* (2013.01); *B01D 46/00* (2013.01); *B01D 46/003* (2013.01); *B01D 46/0031* (2013.01); *B01D 46/12* (2013.01); *B01D 2239/065* (2013.10); *B01D 2275/10* (2013.01)

(58) Field of Classification Search
CPC .............. B01D 46/0001; B01D 46/002; B01D 46/003; B01D 46/0031; B01D 46/12; B01D 2239/065; B01D 2275/10
See application file for complete search history.

(56) References Cited

U.S. PATENT DOCUMENTS

| 4,124,360 A | 11/1978 | Berger et al. |
| 6,523,529 B1 | 2/2003 | Moncelle |
| 2011/0232242 A1* | 9/2011 | Champion et al. ............. 55/483 |

FOREIGN PATENT DOCUMENTS

| DE | 32 25 073 A1 | 1/1983 |
| DE | 102 33 182 A1 | 7/2003 |
| DE | 20 2005 004151 U1 | 7/2006 |

OTHER PUBLICATIONS

Search Report dated Mar. 13, 2013 for Austrian application A 50445/2012.

* cited by examiner

*Primary Examiner* — Robert Clemente
(74) *Attorney, Agent, or Firm* — Workman Nydegger

(57) ABSTRACT

A filtration system for separating accompanying substances, present in liquid, droplet or mist form, from a gaseous material stream, comprising
  a housing, in which there is arranged a filter insert,
  wherein the housing has an inlet and an outlet for said material stream,
  wherein the filter insert comprises at least two filter layers,
  wherein one boundary surface of the first filter layer is essentially in parallel with a boundary surface of the second filter layer,
  wherein at least one boundary surface forms a barrier for said material stream.

11 Claims, 3 Drawing Sheets

FILTRATION SYSTEM

TECHNICAL FIELD

The invention relates to a filtration system for separating accompanying substances, present in liquid, droplet or mist form, from a gaseous material stream, comprising a housing, in which there is arranged a filter insert, wherein the housing has an inlet and an outlet for the material stream.

BACKGROUND ART

The filtration of gaseous material streams for separating liquid fractions that are present in droplet or mist form may be realized in different ways. Depending on the requirements and the framework, there are used various techniques for this purpose.

Known filtration systems are based, e.g., on the principle of centrifugal force for separating droplets having a higher mass than the gas stream. Another known filtration system is based on the principle of electrostatic interaction with particles in material streams. These are so-called electrostatic precipitators.

Filtration systems according to the type, as initially described, are mostly based on filter layers on the basis of fibre material filtration media. Due to their high effectiveness regarding the separation of solid or liquid particles from gaseous material streams or of solid particles from liquid material streams, at simultaneously relatively low system costs, such filtration systems are most common. Two different concepts, hence, are most commonly used. In the so-called surface filters very densely packed filter materials or filter layers having very small pores are inserted, wherein the filter layers are embodied having relatively thin layers in order to prevent too high pressure losses. On the other hand, there are so-called depth filter systems, wherein relatively loosely packed fibre materials are used in correspondingly thick filter layers.

Surface filters and depth filters are known in various embodiments and most commonly used in technical applications. There are, however, known some problems for which there has not been found a solution so far. One big problem is that in the separation of liquid fractions that are present in droplet form from gaseous material streams these droplets will coagulate in the filter layer—in particular in a fibre fabric of the filtration medium—into coherent liquid sectors and fill in the cavities in the filter layers. In this way, these sectors will become impassable for the gas stream. Currently, this problem is solved by correspondingly high filter volumes being situated upstream, which will lead to correspondingly high costs or unacceptably high dimensions for the filter housings, respectively. Successful approaches for discharging the liquid from the filtration medium or the filter insert, respectively, have not been known so far. Discharging the liquids from the filter insert is in particular difficult if the filter layers are very densely packed as well as if the liquid has a relatively high viscosity.

SUMMARY OF INVENTION

In order to achieve a sufficiently high filter service life, which is understood as the maximum operation time until an upper limit value for the pressure loss is reached, currently there are being used high-volume filter inserts.

According to prior art, multi-layered (usually two-layered) filtration systems are very frequently and successfully used for separating viscous liquids entrained in finely dispersed droplets from gaseous material streams, wherein the first level is composed of a relatively coarse-meshed filtration medium having large cavities and a relatively high layer thickness, which will, as pre-filtration, eliminate in particular the larger droplets from the gas stream. The second level or the subsequent layers, respectively, have a very fine-meshed structure, at which the small and smallest droplets are separated off and which usually has a low layer thickness but a large surface. In order to achieve large surfaces these fine filter layers are usually folded and then introduced in so-called bellow bags in the filter housing. It is very difficult to discharge viscous liquids from these fine filter layers. As the liquid content in these layers increases over the operation time of the filter in a steady way and thus more and more hinders the gas flow, these filter levels have to be replaced as soon as a maximum permissible pressure loss is reached.

Hence, it is an object of the present invention to provide a filter system, in which the described disadvantages are reduced. In particular there is to be provided a compact filtration system, which has a possibly infinite or, compared to prior art, at least significantly longer filter operation time. At the same time, however, the separation rate should not be reduced.

This object is solved by a filtration system for separating accompanying substances, present in liquid, droplet or mist form, from a gaseous material stream, comprising a housing, in which there is arranged a filter insert, wherein the housing has an inlet and an outlet for the material stream, wherein said filter insert comprises at least two filter layers, wherein one boundary surface of the first filter layer is essentially in parallel with a boundary surface of the second filter layer, wherein at least one boundary surface forms a barrier for the material stream. In other words the boundary surface forms at least one separation plane for the material stream.

It has surprisingly been found that such a constitution of the filter systems with optionally adapted filter media eliminates finely-dispersed viscous liquid fractions from gaseous material streams at extremely high separation rates, wherein the construction complexity as well as the specific pressure loss will reach a minimum and wherein, simultaneously, a significantly extended filter operation time will be enabled.

Preferably the filter layers are arranged in the housing so that a material stream entering through the inlet enters the filter layers at the front side and flows through the filter insert in longitudinal direction of the filter layers. The orientation of the filter layers in the housing is such that the material stream flows essentially parallel to the boundary surfaces.

The filtering performance and filter service life of the filter system according to the invention can be further increased by the fact that the filter layers have fiber filaments, wherein the fiber filaments have an orientation such that at least 40%, preferably 45%-55% of the total summed have fiber lengths in the direction of material flow. This means that the fiber filaments in this embodiment are such that at least 40%, preferably 45%-55% of the total accumulated fiber lengths are substantially parallel to boundary surface of the filter layer. Preferably the flow direction is substantially horizontal and the direction of the boundary surface is substantially horizontal.

In a preferred embodiment variant there is provided that the filter insert forms a stack of preferably space-free packed individual filter layers, wherein the filter layers have a plane structure and wherein the boundary surfaces between the filter layers are a multiple of the face surface, preferably the boundary surfaces between the filter layers are a at least ten times the face surface, through which the material stream enters and leaves the filter layer, respectively, wherein the flow direction of the material stream is essentially in parallel with the boundary surfaces of the filter layers.

The filter insert is limited and retained by the housing. The filter layers preferably comprise a fibre material. The filter layers may, for example, comprise individual fleece material layers. The filter insert preferably comprises at least four filter layers. The filter layers may be made, e.g., from a conventional fibre fleece material, which is usually marketed in the form of roller barrels. These may be cut according to the geometry of the filter insert and pressed against each other in a stacked form, being limited by the boundaries of the filter insert housing.

It has been shown to be advantageous if the ratio of the length L to the thickness D of the individual filter layers is at least 10, preferably at least 20, especially preferably 30 to 50. The length L essentially corresponds to the path length of the material stream through the filter layers. The filter insert is preferably embodied in such a way so that the path length (=filter depth) covered by the gaseous material stream in the filter insert is at least 50 mm, preferably 150 to 200 mm. The filter insert may comprise several separated, optionally different, filter layers.

The filter performance was increased in an embodiment variant by at least partially staggering the filter layers at the inlet side for the material flow and/or on the exit side of the material flow. That is the individual filter layers are shifted. The filter layers are preferably arranged offset alternately stacked so that there is a tooth profile, it is advantageous if the displacement is between 50 and 150% of the thickness of each filter layer.

With this measure the inlet and outlet area for the material flow can be increased. Thereby it is possible to reduce pressure resistance for entry and to promote the flow of formed liquid (aggregate) at the outlet area possible.

The inventors have further found out that it is advantageous if there are inserted drainage elements in-between the individual filter layers. The drainage elements will absorb the accompanying liquid substances, thus discharging these from the filter layers. In an embodiment variant the drainage elements are formed in layers and arranged between filter layers. In this way, the material stream will be distributed onto individual filter layers, and the partial streams will be limited by the intermediate layers of drainage elements. The distance between adjacent drainage intermediate layers is preferably between 5 and 15 mm, preferably, however, between 5 and 10 mm. In another embodiment variant the drainage elements are inserted in individual filter layers. The drainage elements may then be embodied, e.g., as cylinders, cubes, cuboids and so on. Both concepts may also be present in a combination thereof.

The drainage elements are composed of, e.g., a medium, which exerts an attractive (e.g., hydrophilic or oleophilic) effect on the liquid(s) to be separated. The external surfaces of the drainage elements may have a fine-meshed structure, and the internal space may have a coarse-meshed structure. There may also be present vertical channels, in which the liquid attracted drains off.

It has also been shown to be advantageous if in the filter layers there are embedded drainage channels, which lead out of the filter insert.

In this way it is possible that the liquid separated is moved out of the filter insert or, more precisely, out of the filter layers, respectively, by the liquid being moved in the drainage channels to a drainage bed situated outside of the filter layer.

BRIEF DESCRIPTION OF DRAWINGS

Further advantages and details are described in the following also by way of figures.

DESCRIPTION OF EMBODIMENTS

Figure 1:
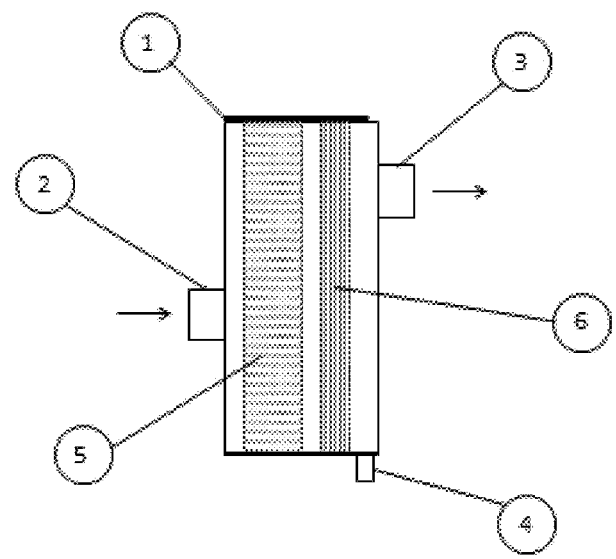
FIG. 1 shows a filtration system according to prior art.

In FIG. 1 there is shown a view through a two-step filtration system according to prior art. The filtration system for separating accompanying substances, present in liquid, droplet or mist form, from a gaseous material stream, comprises a housing 1, in which there is arranged a filter insert 5, 6. The material stream to be filtrated, which is composed of a gas stream with accompanying substances, is symbolically depicted by an arrow. This material stream enters the filtration system at the inlet 2. Subsequently, the material stream enters the filter insert 5, 6, wherein this is composed of a pre-filter 5 and a fine filter 6. In the pre-filter 5 there is realized the separation of larger droplets, a fraction usually containing a substantial mass portion of the liquid. The fine filter 6, which is frequently composed of folded, thin-layered filter papers, is intended to filtrate the finer droplets. The material stream will therein permeate the fine filtration medium transversally and exit the filtration system again at the outlet 3. The collected fluid is removed via discharge 4.

In contrast to the filtration system according to prior art that is depicted in FIG. 1, the concept of depth filtration is improved in the examples of the FIGS. 2 to 5 according to the invention in so far as there is introduced in a determined way in the housing 1 an especially optimized and embodied filter insert.

Figure 2:
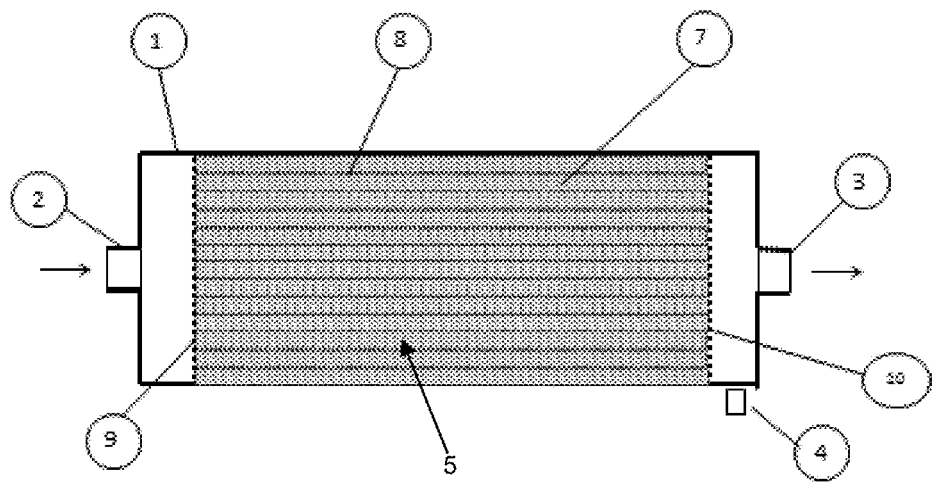
FIGS. 2 to 5 show three embodiments for filtration systems according to the invention.

In FIG. 2, the filter insert 5 is inserted in the housing 1 analogously to the filtration system according to FIG. 1, wherein the filter insert 5 is composed of a stack of several filter layers 7 in the form of fleece layers with fibre filaments. The filtration system is intended for separating accompanying substances, present in liquid, droplet or mist form, from a gaseous material stream and comprises, apart from the housing 1 and the filter insert 5 arranged therein, an inlet 2 and an outlet 3 for the material stream (that is represented by an arrow). The filter insert 5 is arranged in-between inlet 2 and outlet 3. The filter insert 5 further has a plurality of filter layers 7. The boundary surface 8 of the first filter layer is essentially in parallel with a boundary surface 8 of the second filter layer, which is again in parallel with the third filter layer 7, and so on. The filter layers 7 are arranged in the housing 1 in such a way so that a material stream entering through the inlet 2 enters the filter layers 7 at the front side and flows through the filter insert 5. The material stream proceeds essentially paralle to the boundary surfaces 8. At least one, preferably two, of each two neighbouring boundary layers 8 is impermeable for the material stream, i.e., they form a barrier for the material stream. The filter insert 5 is formed by a stack of preferably space-free packed individual filter layers 7, wherein the flow direction of the material stream is essentially in parallel with the boundary surfaces 8 of the filter layers 7.

The boundary surfaces 8 are oriented essentially in parallel with the flow direction of the material stream. The material stream to be filtered that enters the filter housing 1 via the inlet 2 will enter the filter insert 1 at the entry-sided (front-sided) end surfaces 9 of the filter layers 7, wherein in the present case these are fleece layers, and flows in parallel with the boundary surfaces 8 of the filter layers 7, which simultaneously act as separation surfaces of the filter layers 7, towards the exit-sided end surfaces 10. There, the filtrated material stream will exit the filter insert 5 and leave the housing 1 via the outlet 3.

The filter layers 7 comprise fibre filaments. The orientation of the fibres of the filter layers 7 or fleece layers is, in more than 40% of the sum of fibre lengths, in parallel with the surface of the fleece layers or with the boundary surface 8 between the individual fleece layers, respectively. This may be achieved by the fibre directions of fleece materials, in particular thin-layered fleece, being mainly oriented towards the surface of the fleece materials in line with production.

By way of targeted methods, this portion may even be increased without great effort. Of these fibre lengths that are oriented in parallel without special treatment, approximately the half is oriented in the flow direction, whereas the other one is oriented vertically thereto. However, the invention is proposed to provide an anisotropic fiber orientation, wherein the proportion of fiber lengths pointing in the flow direction of the is increased by about 30% compared to the fiber lengths facing perpendicular to the flow direction (and hence in the direction of gravity).

The mounting position of the filter layers 7 in the housing 1 is realized in a way so that the filter layers 7 will be (more or less) horizontal. In this way, there are achieved two very advantageous effects: due to the rather large proportion of fibre lengths being oriented in parallel with the flow direction of the material stream, the material stream is hindered in the flow to a significantly reduced extent, thus substantially reducing the pressure loss through the filtration medium. At the same time, the discharge of the separated liquid towards the bottom is further promoted by the very huge portion of fibre lengths that are vertically oriented.

Rather than the orientation of the fibres themselves it is the entire specific surface of the fibre material that is essentially decisive for the separation rate of the liquid particles.

Figure 3:
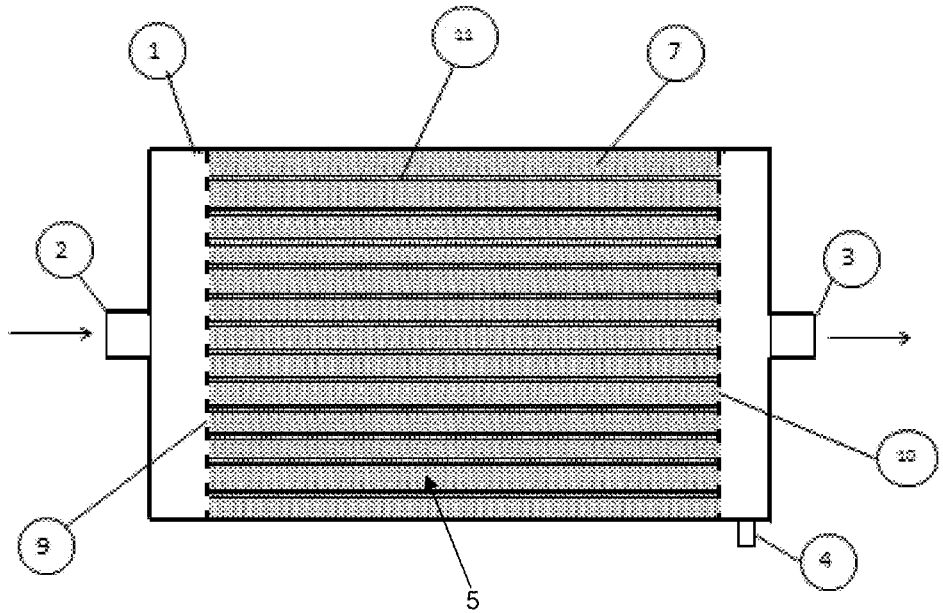

FIG. 3 shows an embodiment variant corresponding to the configuration of the example of FIG. 2, so that (as also described in the following examples of FIGS. 4 and 5) there may be made reference to the preceding figure description as far as components are identical. In contrast to the example of FIG. 2 or in extension thereof, respectively, herein there are mounted two-dimensional drainage elements 11 at the boundary surfaces 8 of the filter layers 7. These have the function to suck away the liquid fractions separated in the filter materials, absorb as well as discharge these towards the bottom and towards the outside from the stack of filter layers 7.

In order to guarantee this function in an optimal way, these drainage elements 11 are composed at the boundary surface to the filter layers, e.g., of a fine-meshed material attracting liquids as well as in the inside thereof of coarse-meshed fabrics or of vertical channels having a sufficiently large cavity cross-section.

The mounting position of the filter insert 5 being composed of the stack of fleece collection elements is carried out in a way according to the example of FIG. 2 so that the fleece separation surfaces and, hence, the collection elements are oriented vertically (to the horizontal). The material stream will also herein flow through the inlet 2, entering the filter insert at the entry-sided (front-sided) end surfaces 9 of the filter layers 7, and flow along the boundary surfaces of the filter layers 7 towards the exit-sided end surfaces 10, exiting the housing 1 through the exit 3.

Figure 4:
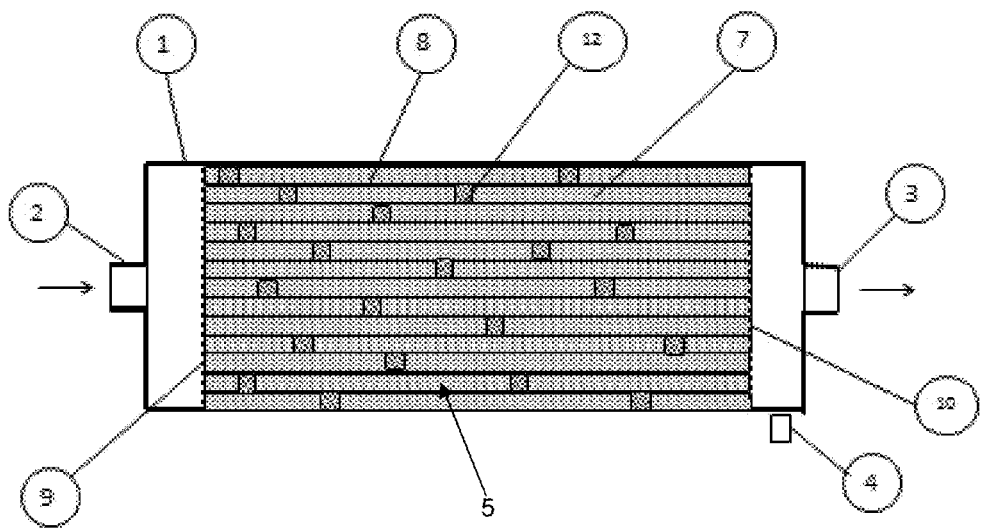

In FIG. 4, there is shown a deviation of the embodiment of the drainage elements 12. The drainage elements 12 are herein embodied not two-dimensionally between the boundary surfaces 8 of the filter layers 7 but rather in the form of vertically oriented, cylindrical bodies, which are inserted in the interruptions of the filter layers 7. Also herein, the external layer of these drainage elements 12 is composed of a fine-meshed or fine-porous, respectively, material attracting liquids, whereas the material in the inside is embodied coarse-porous or channel-like having sufficient cavity space.

Figure 5:
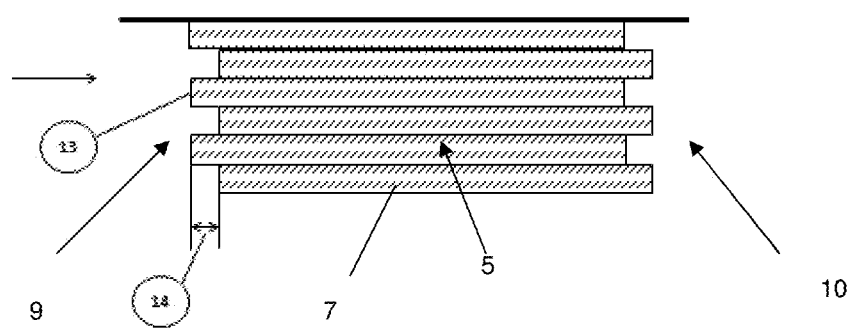

FIG. 5 shows a variant with staggered layer sequence packs. The fleece layers or filter layers 7 are staggered stacked on the inlet side 9, and at the exit side 10, respectively by the distance 14 each. The distance 14 may be selected to be different at the inlet side 9, and at the outlet side 10. It is also possible to provide such a toothed profile only the inlet side 9 or only the exit side 10 at the cost of a slightly reduced efficiency. It has been found to be most effective if the distances take a value of between 50 and 150% of the thickness 13 of the layer 13.

Summarizing, the advantage of the proposed solution to the problem is to realize ideal conditions for the flow of the material stream to be filtrated as well as of the liquid to be discharged from the filter insert. Comprehensive tests and measurements have confirmed the efficiency and effectiveness of the proposed measures.

In this way, it is possible to substantially increase the performance of filtration systems for separating accompanying substances, present in liquid, droplet or mist form, from a gaseous material stream, with simultaneously reduced configuration complexity. An essential advantage is in particular that extremely high separation rates may be combined with unlimited filter operation times.

The invention claimed is:

1. A filtration system for separating accompanying substances, present in liquid, droplet or mist form, from a gaseous material stream, comprising
   a housing, in which there is arranged a filter insert,
   wherein the housing has an inlet and an outlet for said material stream,
   wherein the filter insert comprises at least two filter layers with a first filter layer and a second filter layer,
   wherein one boundary surface of said first filter layer is essentially in parallel with a boundary surface of said second filter layer,
   wherein at least one boundary surface forms a barrier for said material stream,
   wherein the filter layers comprise fiber filaments, wherein the orientation of the fiber filaments is such that at least 40% of the accumulated lengths of the fiber filaments are oriented in flow direction of said material stream.

2. A filtration system according to claim 1, wherein the filter layers are arranged in the housing so that a material stream entering through the inlet enters the filter layers at a front side and flows through the filter insert.

3. A filtration system according to claim 1, wherein said filtration system comprises at least five essentially parallel neighbouring layers.

4. A filtration system according to claim 1, wherein the filter insert forms a stack of space-free packed individual filter layers, wherein the flow direction of the material stream is essentially in parallel with the boundary surfaces of the filter layers.

5. A filtration system according to claim 1, wherein the ratio of the length L to the thickness D of the individual filter layers is at least 10.

6. A filtration system according to claim 5, wherein the ratio of the length L to the thickness D of the individual filter layers is at least 20.

7. A filtration system according to claim 6, wherein the ratio of the length L to the thickness D of the individual filter layers is 30 to 50.

8. A filtration system according to claim 1, wherein the filter layers comprise fiber filaments, wherein the orientation of the fiber filaments is such that at least 45-55% of the accumulated lengths of the fiber filaments are oriented in flow direction of said material stream.

9. A filtration system according to claim 1, wherein the filter layers comprise fiber filaments, wherein the orientation of the fiber filaments is such that not more than 20% of the accumulated lengths of the fiber filaments are oriented perpendicular to the flow direction of said material stream.

10. A filtration system for separating accompanying substances, present in liquid, droplet or mist form, from a gaseous material stream, comprising a housing, in which there is arranged a filter insert, wherein the housing has an inlet and an outlet for said material stream, wherein the filter insert comprises at least two filter layers with a first filter layer and a second filter layer, wherein one boundary surface of said first filter layer is essentially in parallel with a boundary surface of said second filter layer, wherein at least one boundary surface forms a barrier for said material stream, wherein the filter layers are arranged such that the filter layers on the inlet side, on the outlet side or on the inlet side and outlet side of the filter layers for the material flow are alternately displaced, so to form a tooth profile, wherein the distance of the displacement takes a value of between 50 and 150% of the thickness of each filter layer.

11. A filtration system for separating accompanying substances, present in liquid, droplet or mist form, from a gaseous material stream, comprising a housing, in which there is arranged a filter insert, wherein the housing has an inlet and an outlet for said material stream, wherein the filter insert comprises at least two filter layers with a first filter layer and a second filter layer, wherein one boundary surface of said first filter layer is essentially in parallel with a boundary surface of said second filter layer, wherein at least one boundary surface forms a barrier for said material stream, wherein drainage elements or drainage channels are inserted in between said filter layers, which lead out of the filter insert.

\* \* \* \* \*